No. 703,432. Patented July 1, 1902.
F. LOMBARD.
PAN LIFTER.
(Application filed Jan. 23, 1902.)
(No Model.) 2 Sheets—Sheet 1.
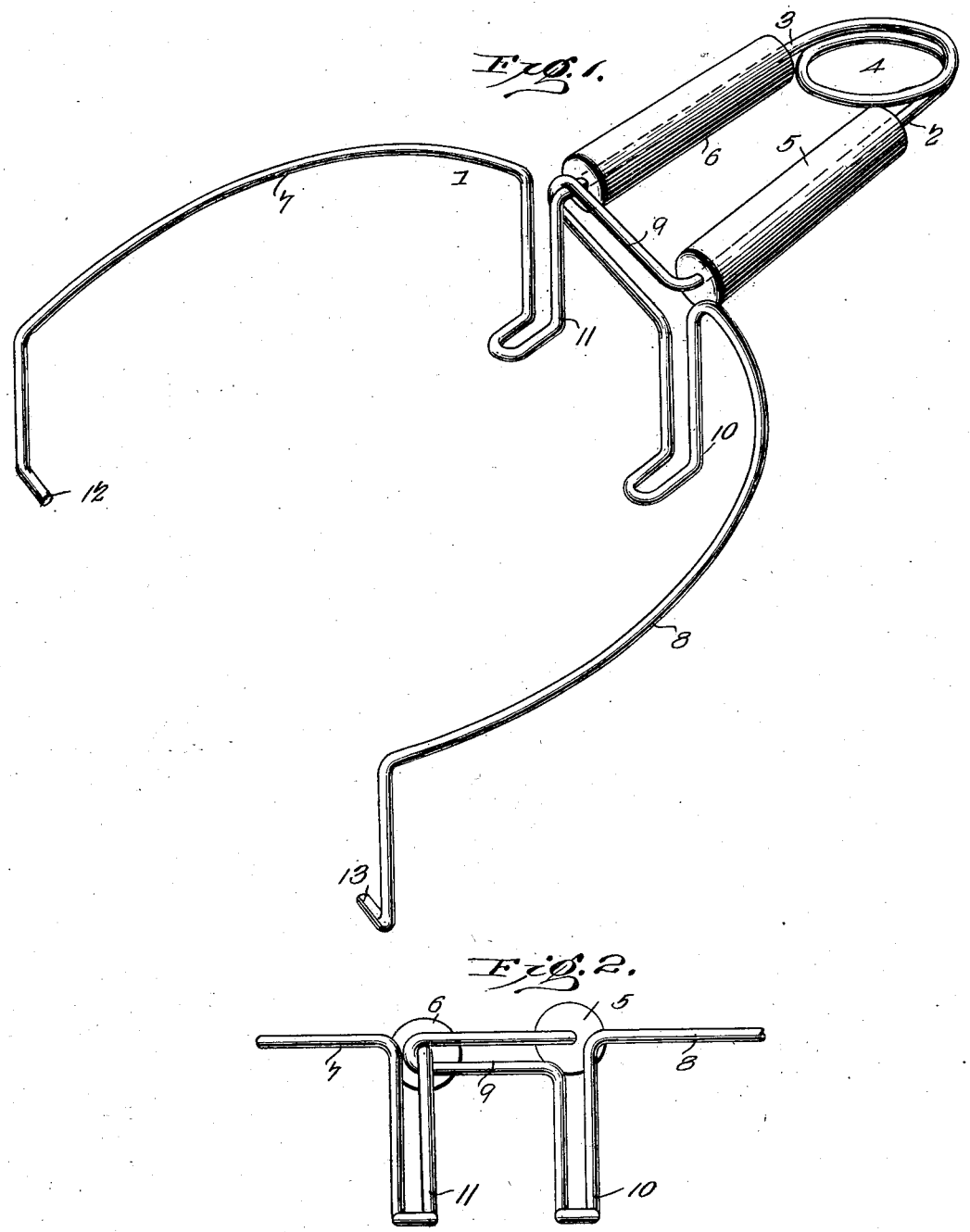

No. 703,432. Patented July 1, 1902.
F. LOMBARD.
PAN LIFTER.
(Application filed Jan. 28, 1902.)
(No Model.) 2 Sheets—Sheet 2.
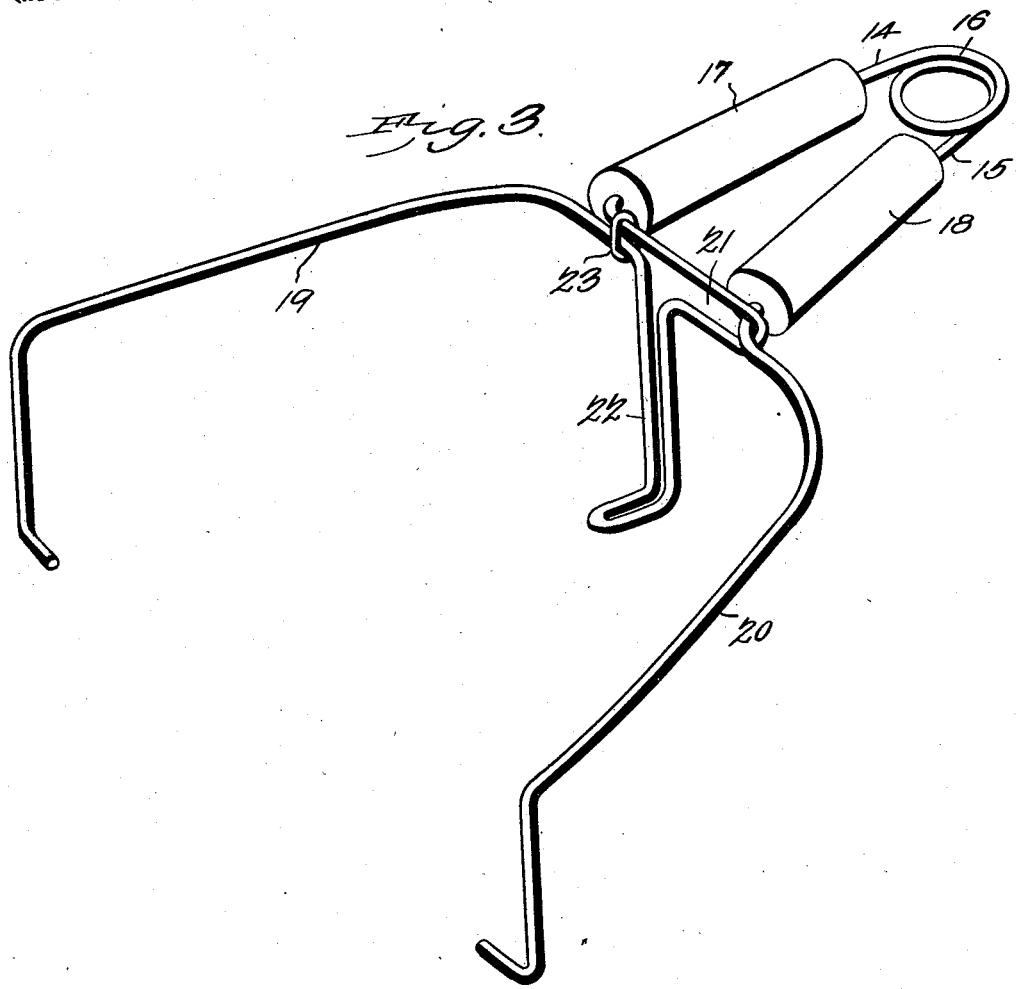
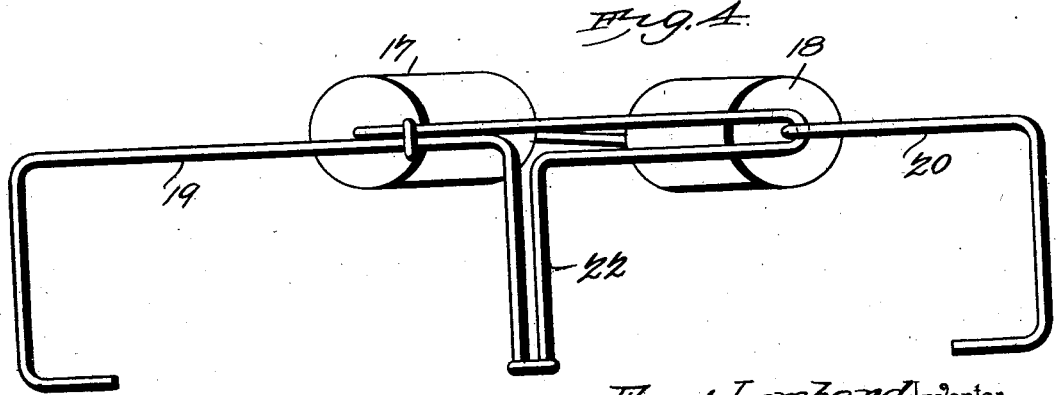
Witnesses Fred Lombard, Inventor.
by C. A. Snow & Co
Attorneys

UNITED STATES PATENT OFFICE.

FRED LOMBARD, OF CRIPPLECREEK, COLORADO.

PAN-LIFTER.

SPECIFICATION forming part of Letters Patent No. 703,432, dated July 1, 1902.

Application filed January 23, 1902. Serial No. 90,977. (No model.)

*To all whom it may concern:*

Be it known that I, FRED LOMBARD, a citizen of the United States, residing at Cripplecreek, in the county of Teller and State of Colorado, have invented a new and useful Pan-Lifter, of which the following is a specification.

The invention relates to improvements in pan-lifters.

The object of the present invention is to improve the construction of devices for lifting pans and analogous receptacles and to provide a simple, inexpensive, and efficient device capable of being readily engaged with a pan or analogous receptacle and adapted to permit the same to be lifted, carried, and otherwise handled without the hands of the operator coming in contact with the receptacle or the contents of the same.

The invention consists in the construction and novel combination and arrangement of parts hereinafter fully described, illustrated in the accompanying drawings, and pointed out in claims hereto appended.

In the drawings, Figure 1 is a perspective view of a pan-lifter constructed in accordance with this invention. Fig. 2 is a detail view illustrating the construction of the inner jaws and the manner of connecting the same. Fig. 3 is a perspective view illustrating the preferred form of my invention. Fig. 4 is a detail view illustrating the construction of the inner jaw and the manner of connecting the sides of the device.

Like numerals of reference designate corresponding parts in all the figures of the drawings.

1 designates the pan-lifter constructed of spring-wire or other resilient material and composed of a pair of shanks 2 and 3, connected by a spring-coil 4 and provided with wooden handles or grips 5 and 6 and connected with curved sides 7 and 8. The wire is coiled between its ends to form the spring 4, and the handles or grips are then placed on the shanks 2 and 3. One of the shanks is then extended to form a transverse guide-loop 9, extending from the handle 5 to the handle 6 and receiving the shank 3, as clearly shown in Fig. 1 of the accompanying drawings. The transverse loop, which extends from the shank 2, also forms a keeper for engaging the shank 3 to limit the separation of the sides, the spring 4 serving to automatically open the pan-lifter after the same has been closed by the operator.

The sides 7 and 8, which are curved to extend across the top of a pan or analogous receptacle, are bent downward to form inner jaws 10 and 11, which consist of L-shaped loops and which are adapted to receive and engage the bottom of a pan or receptacle adjacent to the handles or grips. The loops, which extend downward from the inner ends of the curved sides, are bent outward at right angles to form the lower supporting portions, and the outer ends of the sides are bent downward and inward to form outer substantially L-shaped jaws 12 and 13. The lower portions of the outer L-shaped jaws are arranged in substantially the same plane as the lower portions of the inner jaws or loops, and when a pan is supported by the said jaws it is securely held and may be readily carried and tilted or otherwise handled without liability of the hands of the operator coming in contact with the receptacle or the contents thereof. The shanks are compressed by gripping the handles to engage the sides with a pan or other receptacle, and when the handles or grips are relieved of pressure the spring 4 will automatically disengage the sides and the jaws thereof from the receptacle. The spring is located a sufficient distance from the engaging portions of the device to prevent it from being affected by the heat, to which the engaging portions are subjected in removing receptacles from a stove or other heating apparatus and in placing them on or in the same.

In Figs. 3 and 4 is illustrated the preferred form of the invention, in which is shown a pan-lifter composed of a pair of shanks 14 and 15, connected by a coiled spring 16 and provided with wooden grips or handles 17 and 18, similar to those heretofore described. The pan-lifter is preferably constructed of a single piece of wire and is provided at the inner end of its shanks with sides 19 and 20, having approximately L-shaped jaws at their outer ends. The pan-lifter is provided at one side with a transverse loop 21, extending from the shank 17 and the side 19 and receiving and forming a guide for the side 20. The loop limits the movement or separation of the sides of the pan-lifter, and the latter is provided with a centrally-arranged inner jaw 22, which is substantially U-shaped and which depends from the lower side of the transverse loop. The wire after leaving the shank 17 is bent transversely to form the loop 21 and the lower side of the loop is bent downward, the wire being doubled to form the inner L-shaped jaw. The wire, or rather the upper and lower sides of the transverse loop, is connected adjacent to the shank 17 by a link 23; but any other suitable means may be employed for this purpose. The pan-lifter illustrated in Figs. 3 and 4 operates substantially the same as that shown in Figs. 1 and 2 and is adapted to grip a pan or similar receptacle in the same manner.

It will be seen that the lifting device is exceedingly simple and inexpensive in construction, that it is easily handled, and that it is capable of enabling pans and analogous receptacles to be carried, tilted, and otherwise handled without liability of the operator coming in contact with the receptacle or the contents of the same.

What I claim is—

1. A device of the class described comprising a pair of shanks, a spring connecting the shanks, sides connected with the shanks and provided with jaws, and a narrow supporting and guiding loop extending from one side of the device and receiving the opposite side, and provided with a depending extension forming an inner jaw, substantially as described.

2. A device of the class described consisting of a single piece of resilient material coiled between its ends to provide a spring and extending therefrom to form shanks, one of the sides of the wire being extended laterally and bent backward to form a narrow transverse loop arranged to guide, support and limit the other shank in its movement and extended downward to form an inner jaw, said wire being also extended from both shanks to form pan-engaging sides, substantially as described.

3. A device of the class described comprising a pair of shanks, a spring connecting the shanks, the pan-engaging sides provided at their outer ends with depending jaws, and a narrow transverse loop extending from one side of the device and receiving the opposite side of the same and provided with an inner jaw extending downward from the bottom of the loop and consisting of a looped portion of the wire, substantially as described.

4. A device of the class described comprising the shanks, a spring connecting the shanks, the sides provided at their outer ends with depending L-shaped jaws and a narrow transverse loop extending from one side of the device and receiving and supporting the other side and provided with the inner L-shaped jaw extending downward from the lower portion of the transverse loop, substantially as described.

5. A device of the class described comprising the shanks, a spring connecting the shanks, the sides provided at their outer ends with depending L-shaped jaws, and the narrow transverse loop extending from one side of the device and receiving and supporting the other side of the device and forming a guide for the same and limiting the movement thereof, and provided with an inner depending jaw consisting of an L-shaped loop and formed by extending the wire at the lower side of the transverse loop, substantially as described.

In testimony that I claim the foregoing as my own I have hereto affixed my signature in the presence of two witnesses.

FRED LOMBARD.

Witnesses:
H. L. SHEPHERD,
H. C. WOODHOUSE.